United States Patent [19]

Coran et al.

[11] 4,288,570

[45] Sep. 8, 1981

[54] THERMOPLASTIC COMPOSITIONS OF EPICHLOROHYDRIN RUBBER AND POLY(ALKYL METHACRYLATE) RESIN

[75] Inventors: Aubert Y. Coran; Raman Patel, both of Akron, Ohio

[73] Assignee: Monsanto Company, St. Louis, Mo.

[21] Appl. No.: 149,074

[22] Filed: May 12, 1980

[51] Int. Cl.³ .................. C08L 63/00; C08L 61/08
[52] U.S. Cl. .................................. 525/133; 525/165; 525/183; 525/187; 525/404
[58] Field of Search .................. 525/187, 133, 404; 528/421

[56] References Cited

U.S. PATENT DOCUMENTS

| | | | |
|---|---|---|---|
| 3,445,544 | 5/1969 | Schmitt | 525/187 |
| 3,475,519 | 10/1969 | Noland et al. | 525/187 |
| 3,657,393 | 4/1972 | Komuro et al. | 525/187 |
| 3,781,381 | 12/1973 | Koleske et al. | 260/857 PE |
| 4,141,863 | 2/1979 | Coran et al. | 260/3 |

*Primary Examiner*—Theodore E. Pertilla
*Attorney, Agent, or Firm*—Larry R. Swaney

[57] ABSTRACT

Thermoplastic compositions are described comprising blends of epichlorohydrin rubber and poly(alkyl methacrylate) resin. Compositions in which the rubber is cross-linked are also described.

5 Claims, No Drawings

THERMOPLASTIC COMPOSITIONS OF EPICHLOROHYDRIN RUBBER AND POLY(ALKYL METHACRYLATE) RESIN

This invention relates to thermoplastic compositions and, more particularly, to thermoplastic compositions comprising blends of epichlorohydrin rubber and poly(alkyl methacrylate) resin.

BACKGROUND OF THE INVENTION

High molecular weight polymers are generally incompatible with each other. When two different polymers are mixed, the blend usually exhibits poor mechanical properties, e.g., tensile strength or ultimate elongation. A pair of polymers is seldom sufficiently compatible to give a blend exhibiting mechanical properties as good as those of the weakest polymer. However, when two polymers are sufficiently compatible, the resulting blend can exhibit a valuable combination of properties, i.e., in addition to good mechanical properties, the blends may also exhibit favorable characteristics such as temperature and solvent resistance of the individual polymers.

SUMMARY OF THE INVENTION

It has been discovered that compositions comprising blends of thermoplastic poly(alkyl methacrylate) resin and epichlorohydrin rubber exhibit a valuable combination of properties. Generally, compositions comprising 1-99 parts by weight of poly(alkyl methacrylate) resin and, correspondingly, 99-1 parts by weight of epichlorohydrin rubber are moldable thermoplastic compositions exhibiting high strength and toughness. Compositions comprising 50 or more parts by weight of poly(alkyl methacrylate) resin, per 100 parts by weight of said resin and epichlorohydrin rubber combined, are thermoplastic compositions exhibiting improved impact resistance. Compositions comprising 50 or more parts by weight of epichlorohydrin per 100 total parts by weight of said rubber and resin are elastoplastic, i.e., they exhibit elastomeric properties, yet are processable as thermoplastics.

Preferred compositions of the invention comprise a blend of about 75 to 25 parts by weight of poly(alkyl methacrylate) resin and, correspondingly, about 25 to 75 parts by weight of epichlorohydrin rubber. More preferred elastomeric compositions comprise blends of about 40 to about 60 parts by weight of poly(alkyl methacrylate) resin and, correspondingly, about 60 to about 40 parts by weight of epichlorohydrin rubber.

One embodiment of the invention consists of thermoplastic compositions comprising about 10 to 90 parts by weight of poly(alkyl methacrylate) resin and, correspondingly, about 90 to 10 parts by weight of cross-linked epichlorohydrin rubber. Compositions are thermoplastic if the cross-linked rubber is dispersed throughout the resin as discrete particles. The size of the cross-linked epichlorohydrin rubber particles is generally 50 microns number average or below and preferably is below 10 microns number average, and more preferably, between 0.1-2 microns number average. The particle size may be readily determined by diluting the cross-linked particles in a transparent matrix medium and measuring and counting the particles under a microscope.

An improved balance of properties of thermoplastic blends containing 50 or more parts by weight of epichlorohydrin rubber is obtained by cross-linking the rubber. Cross-linking the rubber increases the tensile strength and improves tension set and toughness of the composition. In addition, cross-linking the rubber improves the solvent resistance and the high temperature properties of the blend. The properties of the composition improve as the extent of cross-linking of the rubber increases. In preferred compositions, rubber curative is used. However, the epichlorohydrin rubber should not be too highly cross-linked, i.e., the cross-link density should not be so high as to reduce the extensability to the extent that it is no longer rubbery. Extensive cross-linking of the poly(alkyl methacrylate) resin should be avoided if thermoplastic compositions are desired. However, it should not be assumed that the curative does not react with the poly(alkyl methacrylate) resin or that there is no reaction between the resin and the epichlorohydrin rubber. There may be highly significant reactions involved, but of limited extent. However, the fact that a large proportion of the poly(alkyl methacrylate) resin can be dissolved by extracting with a solvent indicates that no extensive cross-linking of the resin has occurred.

Another embodiment of the invention consists of a thermoset composition comprising a blend of poly(alkyl methacrylate) resin and cross-linked epichlorohydrin rubber in the form of a continuous network rather than being in particulate form. Thermoset compositions of the invention are prepared by first blending poly(alkyl methacrylate) resin and epichlorohydrin rubber at a temperature sufficient to melt the resin by using conventional masticating equipment. The composition is then transferred to a mill where curatives are incorporated therein at a temperature below the activation temperature of the curative system. The temperature may also be below the softening temperature of the resin which could become a particulate phase therefore, especially after mill working. The curable composition is then sheeted by passage through a roll mill or a shaped specimen is prepared. The sheet or shaped specimen is then cured by conventional means, typically by heating under pressure. The specimens may be cured either above or below the melting point of the poly(alkyl methacrylate) resin. When a specimen is cured below the melting point of the resin, the physical properties of the cured specimen may be dependent upon the direction of measurement because of orientation of resin particles. The degree of anisotropy of any particular specimen depends upon the proportions of resin in the blend and the degree of orientation. Orientation of the resin particles can be conveniently achieved by passing a sheeted material one or more times through the rolls of an even speed mill.

Thermoplastic compositions of the invention in which the rubber is cross-linked are preferably prepared by dynamic vulcanization, a process which comprises blending a mixture of epichlorohydrin rubber and poly(alkyl methacrylate) resin and curatives in amounts sufficient to cross-link the rubber, then masticating the blend at a temperature sufficient to effect cross-link formation. Conventional masticating equipment, for example, a Banbury mixer, a Brabender mixer, or a mixing extruder are used. An intimate mixture of poly(alkyl methacrylate) resin and epichlorohydrin rubber are mixed at a temperature sufficient to melt the resin. After the resin is melted, curative is added. Heating and masticating at vulcanization temperatures are generally adequate to complete the cross-link formation in a few minutes or less, but if shorter times are desired, higher temperatures may be used. A suitable range of temperatures for cross-link formation is from about the softening or melting temperature of the poly(alkyl methacrylate) resin to the decomposition temperature of the rubber. Typically, the range is from about 100° C. to 250° C. A preferred range of temperatures is from about 175° C. to about 225° C. Blends are treated with curatives in amounts and under time and temperature conditions known to give cured products of epichlorohydrin rubber alone. This can be determined from studies of static cures of epichlorohydrin rubber in molds, in the absence of poly(alkyl methacrylate) resin. Thermoset compositions are avoided by simultaneously masticating and curing the blends. To obtain thermoplastic compositions, it may be important that mixing continues without interruption until cross-linking occurs. Sometimes, when appreciable cross-linking is allowed after mixing has stopped, a thermoset unprocessable composition may be obtained. However, this material may be converted to a thermoplastic by cold milling or by remixing in a mixer until the cross-linked rubber is reduced to a particle size of 50 microns or below. A few simple experiments within the skill of the art utilizing available curative systems will suffice to determine their applicability for the preparation of the improved products of this invention.

Methods other than the dynamic vulcanization can be utilized to prepared thermoplastic compositions of the invention. For example, epichlorohydrin rubber can be fully vulcanized in the absence of the poly(alkyl methacrylate) resin, comminuted, and mixed with the resin at a temperature above the melting or softening point of the resin. Provided that the cross-linked rubber particles are small, well dispersed and in an appropriate concentration, compositions within the invention are obtained by blending cross-linked epichlorohydrin rubber and poly(alkyl methacrylate) resin. In addition, provided that enough poly(alkyl methacrylate) resin is present, thermoplastic compositions may be prepared by masticating a blend of poly(alkyl methacrylate) resin and epichlorohydrin rubber, incorporating curatives and then curing under static conditions, such as, in a mold.

Thermoplastic compositions of the invention are all processable in an internal mixer, to products which, upon transferring at temperatures above the softening of the poly(alkyl methacrylate) resin, to the rotating rolls of a rubber mill, form continuous sheets. The sheets are reprocessable in the internal mixer, after reaching temperatures above the softening or melting temperature of the resin. The material is again transformed to the plastic state (molten state of the resin) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding or calendering.

Epichlorohydrin rubbers satisfactory for the practice of the invention are rubbery homopolymers of epichlorohydrin (ASTM type CO) and rubber copolymers of epichlorohydrin with ethylene oxide (ASTM type ECO). Suitable copolymers may contain a small quantity of a third monomer to introduce enough olefinic unsaturation into the molecule to make the rubber vulcanizable with sulfur vulcanization systems. Epichlorohydrin homopolymer and copolymer rubbers are vulcanized (cross-linked) with difunctional vulcanizing agents such as polyamines and thioureas. Examples of suitable vulcanizing agents are hexamethylene diamine carbamate, hexamethylenetetramine, mixed polyamines, 2-mercaptoimidazoline, ethylenethiourea, 1,3-diethylthiourea, piperazine hexahydrate and trimethylthiourea. Unsaturated epichlorohydrin rubbers may also be vulcanized with sulfur cure systems suitable for other low unsaturation diene type rubbers. Epichlorohydrin rubber is commercially available under the trademarks Hydrin® Elastomers and Herchlor® Rubbers. Epichlorohydrin homopolymer rubber is sold under the tradename of Hydrin 100 and Herchlor H. Epichlorohydrin copolymer rubber is sold under the tradenames of Hydrin 200 and 270 and Herchlor C. Sulfur curable epichlorohydrin copolymer rubber containing about 2% unsaturation is sold under the tradename of Hydrin 400.

Suitable thermoplastic poly(alkyl methacrylate) resins comprise high molecular weight solid polymers having glass transition temperatures of 50° C. or more, prepared by polymerization of one or more alkyl methacrylates, usually in the presence of a catalyst. Examples of satisfactory monomers are methyl methacrylate, ethyl methacrylate, 2-cyanoethyl methacrylate, isopropyl methacrylate, isobutyl methacrylate, benzyl methacrylate and cyclohexyl methacrylate. Commercially available thermoplastic poly(alkyl methacrylate) resins and blends thereof may be advantageously used in the practice of the invention with poly(methyl methacrylate) resin, (PMMA), being preferred.

The properties of the compositions of the invention may be modified by addition of ingredients which are conventional in the compounding of epichlorohydrin rubber and poly(alkyl methacrylate) resin. Examples of such ingredients include carbon black, silica, titanium dioxide, pigments, clay, silanes, titanates or other coupling agents, stabilizers, antidegradants, plasticizers, processing aids, adhesives, tackifiers, wax, and discontinuous fibers such as wood cellulose or glass fibers, etc. The addition of particulate filler, preferably prior to dynamic vulcanization, is particularly recommended. Preferably, the particulate filler is masterbatched with the epichlorohydrin rubber and the masterbatch is then mixed with the resin. Particulate fillers, such as carbon black or silane-treated silica or clay, improve the tensile strength. Typical additions of particulate fillers or reinforcement fillers such as carbon black comprise about 20–150 parts by weight of filler per 100 parts by weight of rubber. The amount of particulate filler which can be used depends, at least in part, upon the type of filler and the presence of other ingredients such as plasticizers.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with other thermoplastics, such as nylon and polyesters. The compositions of the invention are blended with thermoplastics using conventional mixing equipment. The properties of the blend depend upon the proportions.

Tensile properties of the compositions are determined by ASTM procedure D-638. Specimens are pulled with a tensile tester at 20 inches per minute to failure. The term "elastomeric" as used herein and in the claims means a composition which possesses the property of forcibly retracting within ten minutes to less than 160% of its original length after being stretched at room temperature to twice its unstressed length and held for ten minutes before release. True stress at break (TSB) is the tensile strength at break multiplied by the extension ratio also at break, extension ratio being the length of a tensile test specimen at break divided by the original, unstressed length of the test specimen. Alternately, extension ratio is 1.00 plus 1/100 of the percent ultimate elongation. Especially preferred compositions of the invention are rubbery compositions having tension set values of about 50% or less which compositions approximate the definition for rubber as defined by ASTM Standards, Vol. 28, page 756 (D1566). More preferred compositions are compositions having a Shore D hardness of 50 or below or a 100% modulus between 1–15 MPa (megapascals) or a Young's modulus below 100 MPa.

DESCRIPTION OF THE PREFERRED EMBODIMENTS

Compositions illustrating the invention are prepared by charging poly(methyl methacrylate) resin, PMMA, and epichlorohydrin rubber, in the indicated amounts (all parts by weight) to a Brabender mixer at 180° C. and a mixing speed of 80 rpm. The epichlorohydrin rubber is purchased Hydrin ® 400 Elastomer, a sulfur vulcanizable grade comprising a copolymer of epichlorohydrin, ethylene oxide and sufficient olefinic monomer to give about 2% residual olefinic unsaturation. The PMMA is purchased Lucite ® 147 acrylic resin which meets ASTM specification D-788 for grade 8 acrylic resin. The compositions are mixed for two minutes after the PMMA is melted; they are then removed from the mixer, cooled, returned to the mixer and mixed for 2–2½ additional minutes. Test specimens are prepared by compression molding at 225° C. and then evaluated. Compositions containing cured epichlorohydrin rubber are prepared in a similar manner except after the PMMA melts and a blend is formed, 10 parts by weight of dimethylol t-octylphenol curing resin, SP-1045, per 100 parts by weight of epichlorohydrin rubber are added and mixing is continued until maximum consistency is reached. The composition is removed from the mixer, cooled, then returned to the mixer and mixed for 2–2½ additional minutes. Test specimens are prepared by compression molding as above. The effect of the proportions of epichlorohydrin rubber and poly(methyl methacrylate) resin in the blend is shown in Table 1. All compositions are processable as thermoplastics. The properties of blends in which the rubber is cured is shown in parentheses. The properties indicate that the two polymers are sufficiently compatible over the entire range of proportions. The data also show that compositions comprising up to 50 weight percent of PMMA are elastomeric. Curing the rubber in the blend increases solvent resistance of the composition and increases the tensile strength of compositions comprising greater proportions of epichlorohydrin rubber.

Compositions comprising blends of different types of epichlorohydrin rubber are illustrated in Table 2. Stock 1 contains epichlorohydrin homopolymer rubber purchased as Hydrin ® 100 Elastomer. Stock 2 contains epichlorohydrin rubber comprising a copolymer of epichlorohydrin and ethylene oxide purchased as Hydrin ® 200 Elastomer. The blends are prepared by the same procedure as in Table 1. The data show that the polymers are sufficiently compatible and that compositions exhibiting a useful combination of properties are obtained.

TABLE 1

|  | 1 | 2 | 3 | 4 | 5 | 6 | 7* | 8* | 9* |
|---|---|---|---|---|---|---|---|---|---|
| Epichlorohydrin Rubber | 90 | 80 | 70 | 60 | 50 | 40 | 30 | 20 | 10 |
| PMMA | 10 | 20 | 30 | 40 | 50 | 60 | 70 | 80 | 90 |
| Properties |  |  |  |  |  |  |  |  |  |
| TS, MPa | 0.2 | 0.8 | 5.1 | 10.9 | 20.0 | 20.0 | 25.2 | 31.4 | 62.6 |
|  | (1.6) | (4.4) | (7.1) | (11.8) | (18.6) | (21.2) | (27.1) | (31.5) | (69.4) |
| M100, MPa | 0.3 | 0.5 | 0.6 | 1.3 | 4.8 | 12.9 | 21.7 | — | — |
|  | (0.3) | (0.5) | (0.6) | (1.3) | (5.4) | (13.0) | (21.3) | — | — |
| E, MPa | 0.3 | 0.6 | 0.4 | 1.6 | 5.1 | 191 | 1027 | 1750 | 1997 |
|  | (0.3) | (0.5) | (0.8) | (1.6) | (6.8) | (181) | (1033) | (1649) | (1735) |
| Elong., % | 2030 | 2600+ | 1500 | 710 | 490 | 310 | 140 | 47 | 6 |
|  | (2380) | (1930) | (1310) | (800) | (460) | (300) | (170) | (52) | (7) |
| Tension Set, % | 40 | 30 | 20 | 15 | 15 | 65 | Bk | Bk | Bk |
|  | (19) | (18) | (15) | (14) | (20) | (68) | Bk | Bk | Bk |
| TSB, MPa | 3.6 | >22 | 82 | 88 | 118 | 82 | 62 | 46 | 66 |
|  | (38) | (89) | (100) | (106) | (105) | (84) | (72) | (48) | (74) |
| Shore D Hardness | 5 | 8 | 9 | 16 | 31 | 55 | 65 | 72 | 76 |
|  | (5) | (8) | (10) | (16) | (33) | (60) | (70) | (75) | (85) |

*Stocks 7–9 were tested according to ASTM D1708-66 by pulling the specimens at one inch per minute to failure.

TABLE 2

|  | 1 | 2 |
|---|---|---|
| Hydrin 100 | 50 | — |
| Hydrin 200 | — | 50 |
| PMMA | 50 | 50 |
| Properties |  |  |
| TS, MPa | 17.6 | 17.8 |
| M100, MPa | 11.4 | 4.4 |
| E, MPa | 156 | 20 |
| Elong., % | 350 | 480 |
| Tension Set, % | 54 | 20 |
| TSB, MPa | 79 | 103 |
| Shore D Hardness | 56 | 35 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of about 75 to 50 parts by weight of cross-linked epichlorohydrin rubber in the form of dispersed particles of a size of 50 microns number average or less and about 25 to 50 parts by weight of poly(alkyl methacrylate) resin per 100 total parts by weight of epichlorohydrin rubber and poly(alkyl methacrylate) resin, which composition is elastomeric and processable as a thermoplastic.

2. The composition of claim 1 in which the poly(alkyl methacrylate) resin is poly(methyl methacrylate) resin.

3. The composition of claim 2 in which the epichlorohydrin rubber is a homopolymer for epichlorohydrin.

4. The composition of claim 2 in which the epichlorohydrin rubber is a copolymer of epichlorohydrin and ethylene oxide.

5. The composition of claim 2 in which the epichlorohydrin rubber is cross-linked by a methylol phenolic curative.

* * * * *